(12) United States Patent
Baer et al.

(10) Patent No.: US 7,303,062 B2
(45) Date of Patent: *Dec. 4, 2007

(54) BULK MATERIAL PUMP FEEDER WITH REDUCED DISK JAMMING

(76) Inventors: Timothy R. Baer, 35 Cedarcroft Rd., Gibbsboro, NJ (US) 08026; James T. Foley, 523 Sharp Dr., Mickleton, NJ (US) 08056

(*) Notice: Subject to any disclaimer, the term of this patent is extended or adjusted under 35 U.S.C. 154(b) by 0 days.

This patent is subject to a terminal disclaimer.

(21) Appl. No.: 11/384,797

(22) Filed: Mar. 20, 2006

(65) Prior Publication Data

US 2006/0157322 A1   Jul. 20, 2006

Related U.S. Application Data

(63) Continuation of application No. 10/625,253, filed on Jul. 23, 2003, now Pat. No. 7,044,288, which is a continuation-in-part of application No. 10/119,359, filed on Apr. 9, 2002, now Pat. No. 6,832,887.

(51) Int. Cl.
*B65G 31/04* (2006.01)

(52) U.S. Cl. ............... 198/642; 406/99; 415/90; 415/126; 198/718; 198/723

(58) Field of Classification Search ............... None
See application file for complete search history.

(56) References Cited

U.S. PATENT DOCUMENTS 1,061,142 A    5/1913   Tesla 2,632,399 A    3/1953   Hyre
2,868,351 A    1/1959   Hegmann
3,245,613 A    4/1966   Jonakin
3,787,093 A    1/1974   Hanselmann et al.
3,920,116 A   11/1975   Butler
4,516,674 A    5/1985   Firth (Continued)

FOREIGN PATENT DOCUMENTS

EP    0 544 621    6/1993

(Continued)

OTHER PUBLICATIONS

International Search Report Dated Jul. 4, 2003.

*Primary Examiner*—Joe Dillon, Jr.
(74) *Attorney, Agent, or Firm*—Morgan, Lewis & Bockius LLP (57) ABSTRACT

A bulk materials pump feeder having a housing and a rotating drive rotor for transferring material from an inlet to an outlet of the housing. The drive rotor has a hub. Drive disks extend away from the hub toward a housing inner wall. Three structural features of the feeder reduce the tendency of material to jam between the drive rotor and the housing or other stationary parts. First, the distance between the circumferential edges of the drive disks and the housing inner wall increases from the inlet to the outlet in the direction of rotation of the drive rotor. Second, a low-friction brush seal disposed on the periphery of the drive disks seals the area between the periphery of the drive disks and the inner wall. Finally, a materials scraper having a flexible tip is mounted in the housing and extends into the drive rotor between the drive disks.

15 Claims, 8 Drawing Sheets

U.S. PATENT DOCUMENTS

| | | |
|---|---|---|
| 4,826,401 A | 5/1989 | Clark et al. |
| 4,988,239 A | 1/1991 | Firth |
| 5,051,041 A | 9/1991 | Firth |
| 5,186,604 A | 2/1993 | Iorio et al. |
| 5,190,140 A | 3/1993 | Buschbom |
| 5,355,993 A | 10/1994 | Hay |
| 5,356,280 A | 10/1994 | Ponzielli |
| 5,402,876 A | 4/1995 | Hay |
| 5,485,909 A | 1/1996 | Hay |
| 5,497,873 A | 3/1996 | Hay |
| 5,533,650 A | 7/1996 | Conrad et al. |
| 5,551,553 A | 9/1996 | Hay |
| 6,135,730 A | 10/2000 | Yoshioka |
| 6,213,289 B1 * | 4/2001 | Hay et al. ............... 198/642 |
| 6,375,412 B1 | 4/2002 | Dial |
| 6,431,831 B1 | 8/2002 | Addie et al. |
| 6,523,726 B1 * | 2/2003 | Tschantz ............... 222/353 |
| 6,575,695 B1 | 6/2003 | Miyamoto |

FOREIGN PATENT DOCUMENTS

| | | |
|---|---|---|
| EP | 0544621 A | 6/1993 |
| WO | WO 96/24810 | 8/1996 |
| WO | WO 00/07912 A | 2/2000 |

* cited by examiner

BULK MATERIAL PUMP FEEDER WITH REDUCED DISK JAMMING

CROSS REFERENCE TO RELATED APPLICATIONS

This application is a continuation of prior U.S. application Ser. No. 10/625,253 filed on Jul. 23, 2003, now U.S. Pat. No. 7,044,288 which is a continuation-in-part of U.S. patent application Ser. No. 10/119,359 now U.S. Pat. No. 6,832,887, filed on behalf of inventors Timothy R. Baer and James T. Foley on Apr. 9, 2002, titled "Bulk Material Pump Feeder," assigned to the assignee of the present application, all of which are hereby incorporated by reference in their entirety herewith.

TECHNICAL FIELD

The present invention relates, in general, to materials handling equipment and, in particular, to a pump feeder of materials handling equipment that feeds bulk materials.

BACKGROUND OF THE INVENTION

In certain bulk materials handling equipment, such as the equipment described and illustrated in U.S. Pat. No. 5,051,041 and U.S. Pat. No. 5,355,993, a pump feeder moves bulk material through a housing from an inlet to an outlet by a rotating drive rotor having two or more drive disks mounted to or integral with a rotating hub. In the past, this type of equipment has been used for feeding coal and other breakable material having uniform and non-uniform gradation. Typically, the drive systems for this equipment have delivered large torque at slow speed.

As such equipment is adapted to handle different materials supplied in different sizes, problems that have not been encountered previously are arising. One such problem of major importance is the tendency of smaller size equipment, handling harder, smaller size material such as plastic, to stall, sometimes only temporarily, as the material being handled wedges between the rotating drive rotor and the housing or stationary parts mounted to the housing. This wedging of material can occur, for example, between the drive disks of the drive rotor and the housing inner wall or between the hub of the drive rotor and a materials scraper mounted to the inner wall of the housing.

Simply increasing the drive power (i.e., providing a larger drive motor) to overcome the wedging is not, in most instances, an adequate or satisfactory solution to the problem. Cost and space limitations are but two restrictions on simply providing increased drive power. Certain of the materials being handled are not easily breakable, so a larger drive motor merely increases the effect of the material wedging between the rotating drive rotor and the housing or stationary parts mounted to the housing. Thus, a larger drive motor can exacerbate the problem, resulting in a complete stoppage of operation and damage to the equipment. With breakable materials, such as coal, the drive torque is large enough to break or pulverize the material into smaller pieces that do not wedge between the rotating drive rotor and the housing or stationary parts mounted to the housing.

Although this adverse wedging effect might not be a regular occurrence and is likely to be different for handling different types of material, when it does occur, even temporarily, it affects accuracy and feeder performance to an unacceptable extent. Because the tendency of the equipment to stall, either temporarily or for longer periods of time, due to this wedging is greater at higher speed operation of the equipment, slowing down the operation of the equipment to reduce the likelihood of material wedging, while possibly reducing the likelihood of wedging, also is unacceptable.

To overcome the shortcomings of existing devices, a new bulk materials pump feeder is provided. An object of the present invention is to provide an improved bulk materials pump feeder that minimizes jamming of the disks. A related object is to prevent stall, even temporarily, caused as the material being handled wedges between the rotating drive rotor and the housing or stationary parts mounted to the housing. Another object is to avoid having to increase the drive power to overcome the wedging problem. It is still another object of the present invention to achieve these advantages within the confines of cost and space limitations. Yet another object of this invention is to provide a bulk materials pump feeder adapted to handle a wide variety of different materials supplied in different sizes. Additional objects are to achieve accuracy and assure optimal feeder performance.

SUMMARY OF THE INVENTION

To achieve these and other objects, and in view of its purposes, the present invention provides a bulk materials pump feeder. The bulk materials pump feeder, as constructed in accordance with the present invention, includes a housing having an inlet, an outlet, and an inner wall extending from the inlet of the housing to the outlet of the housing. This bulk materials pump feeder also includes a drive rotor having a hub rotatable about a rotation axis and a plurality of drive disks (two are illustrated, but more are possible) extending away from the hub toward the inner wall of the housing.

Three structural embodiments or features of the bulk materials pump feeder reduce the tendency of material to jam between the drive rotor and the housing or other stationary parts mounted to the housing. First, the distance between the circumferential edges of the drive disks and the housing inner wall increases from the inlet to the outlet in the direction of rotation of the drive rotor. Second, a low-friction brush seal disposed on the periphery of the drive disks seals the area between the periphery of the drive disks and the inner wall. Finally, a materials scraper having a flexible tip is mounted in the housing and extends into the drive rotor between the drive disks. The inner wall of the housing, the drive disks, and the hub define a materials transfer duct through which material is transferred from the inlet of the housing to the outlet of the housing.

The three embodiments of the present invention may be independently incorporated in the bulk materials pump feeder according to the present invention. Alternatively, any two or even all three of the embodiments can be combined into a single bulk materials pump feeder. At least for certain applications, such combination may be expected to achieve a synergistic effect.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity.

Included in the drawing are the following figures.

DETAILED DESCRIPTION OF THE INVENTION

Figure 1:
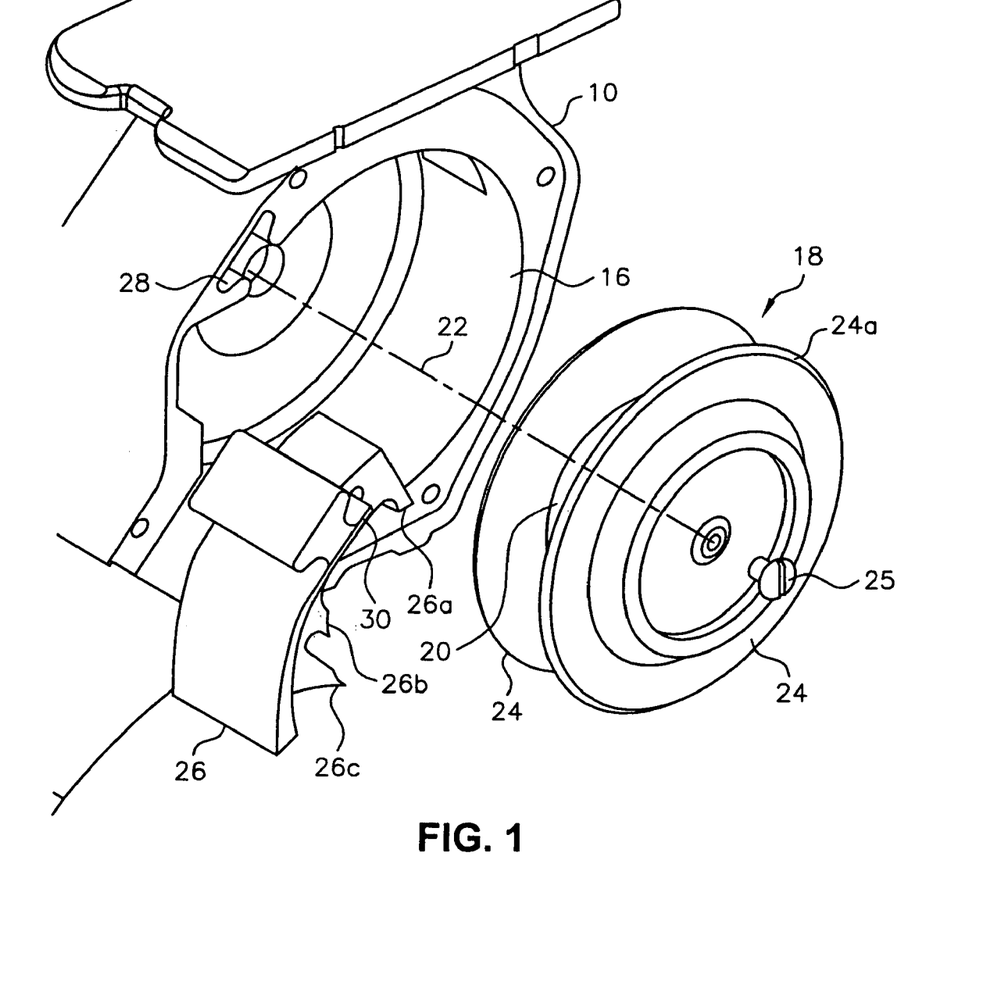
FIG. 1 is an exploded, perspective view of a bulk materials pump feeder constructed in accordance with a first embodiment of the present invention.
Figure 2:
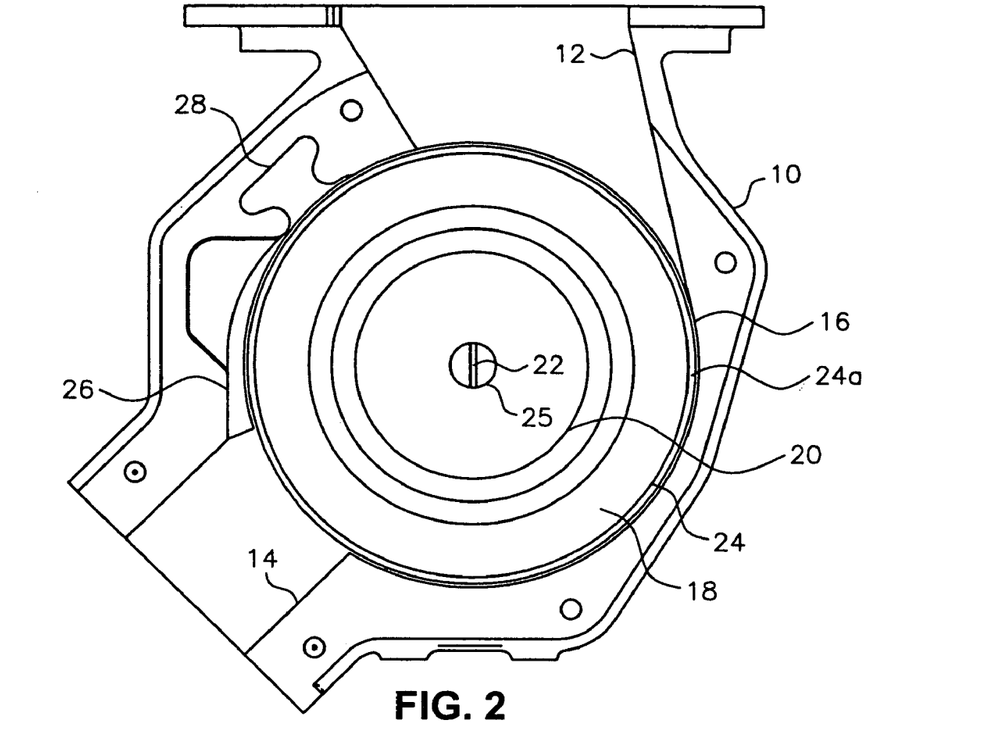
FIG. 2 is a side view of the bulk materials pump feeder shown in FIG. 1.

Referring to FIGS. 1 and 2, a bulk materials pump feeder, constructed in accordance with the present invention, includes a housing 10 having an inlet 12, an outlet 14, and an inner wall 16 extending from inlet 12 to outlet 14. A bulk materials pump feeder, constructed in accordance with the present invention, is generally similar in construction and operation to the units described and illustrated in U.S. Pat. No. 5,051,041 and U.S. Pat. No. 5,355,993, the contents of which are incorporated in this document by reference.

The bulk materials pump feeder of FIGS. 1 and 2 also has a drive rotor 18 having a hub 20, which is rotatable about a rotation axis 22, and a pair of drive disks 24 which extend away from hub 20 toward inner wall 16 of housing 10. For the embodiment of the invention being described, hub 20 and drive disks 24 are formed as a single, integral, monolithic unit. Drive disks 24 can be formed with radially extending discontinuities on the interior faces as described and illustrated in U.S. Pat. No. 5,355,993 to facilitate transfer of material from inlet 12 to outlet 14 of housing 10. Preferably, the outside surfaces of drive disks 24 each have a bevel 24a at the circumferential edge of the drive disk for a reason to be explained below.

Drive rotor 18 is mounted in housing 10 for rotation about rotation axis 22 and is held in place by, for example, a screw 25. For the embodiment of the invention illustrated in the figures and being described, drive rotor 18 has two drive disks 24. Drive rotor 18 can be arranged, however, to have more than two drive disks 24. The number of drive disks 24 to be included in drive rotor 18 is dependent on the particular application of the bulk materials pump feeder (i.e., materials being transferred, performance specifications, etc.).

A. FIRST EMBODIMENT

Figure 3:
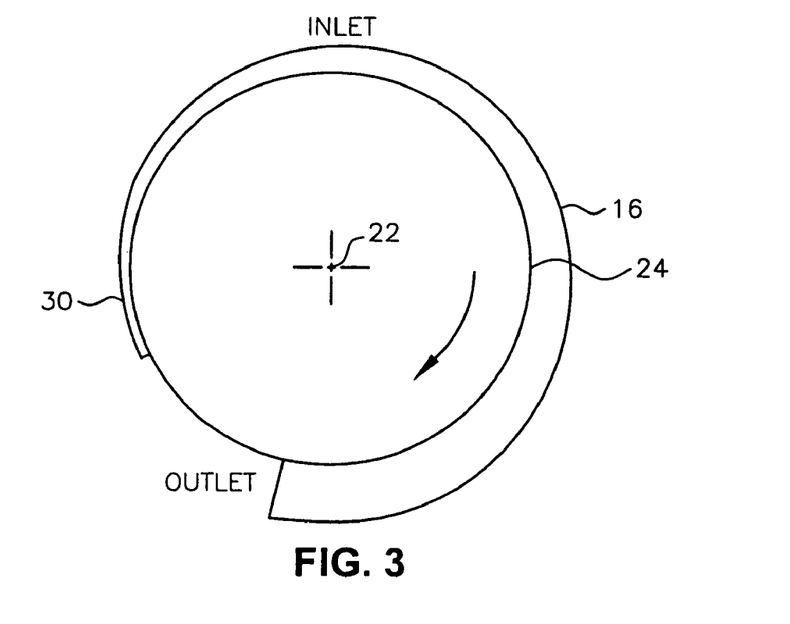
FIG. 3 is a schematic drawing of the relationship between the drive disks and the inner wall of the housing of the bulk materials pump feeder shown in FIGS. 1 and 2.

As shown most clearly in FIG. 3, which is a schematic drawing of the relationship between drive disks 24 and inner wall 16 of housing 10, the distance between the circumferential edges of drive disks 24 and inner wall 16 of housing 10 increases from Inlet 12 of housing 10 to OUTLET 14 of housing 10 in the direction of rotation of drive rotor 18, which is clockwise as indicated by the arrow for the embodiment of the invention illustrated in the figures and being described. Drive disks 24 and inner wall 16 of housing 10 can be shaped in different ways to provide the desired spacing between the two components. For the embodiment of the invention illustrated in the figures and being described, drive disks 24 are circular and extend away from hub 20 perpendicular to rotation axis 22 of hub 20, and inner wall 16 of housing 10 is spiral shaped. The spiral-shaped inner wall 16 of housing 10 can be defined by the Archimedes spiral equation:

$$R = \theta * a$$

where: "R" is the radius; "θ" is the polar angle; and "a" is the rate of radial increase given in some unit of measure per angular unit, such as mm/degree. The distance between the circumferential edges of drive disks 24 and inner wall 16 of housing 10 is exaggerated in FIG. 3 for purposes of illustration.

For the embodiment of the present invention represented by FIG. 3, the desired increasing distance between the circumferential edges of drive disks 24 and inner wall 16 of housing 10 is effected by the spiral shape of inner wall 16 of housing 10. This desired increasing distance between the circumferential edges of drive disks 24 and inner wall 16 of housing 10 might also be achieved by the design and provision of alternative components or by a combination of the design of such alternative components and the design of inner wall 16 of housing 10.

Inner wall 16 of housing 10, the inside surfaces of drive disks 24, and hub 20 define a materials transfer duct through which material is transferred from inlet 12 of housing 10 to outlet 14 of housing 10. Drive rotor 18 is rotated by a motor (not shown) coupled to drive rotor 18 by a suitable mechanism. As drive rotor 18 is rotated, drive disks 24 cause material, introduced into the bulk materials pump feeder through inlet 12 of housing 10, to be transferred to outlet 14 of housing 10 where the material is discharged from the bulk materials pump feeder.

Pieces of material being transferred through the bulk materials pump feeder from inlet 12 to outlet 14 that tend to wedge between inner wall 16 of housing 10 and the circumferential edges of drive disks 24 move in the direction of rotation of drive rotor 18 to a larger spacing between the circumferential edges of drive disks 24 and inner wall 16 of housing 10 and do not wedge because of the increasing space between the circumferential edges of drive disks 24 and inner wall 16 of housing 10. Instead, this material is discharged through outlet 14. By beveling the outside surfaces of drive disks 24 at the circumferential edges, the surface areas of the circumferential edges of drive disks 24 are minimized, thereby reducing the tendency of material to wedge between drive disks 24 and inner wall 16 of housing 10.

Figure 4:
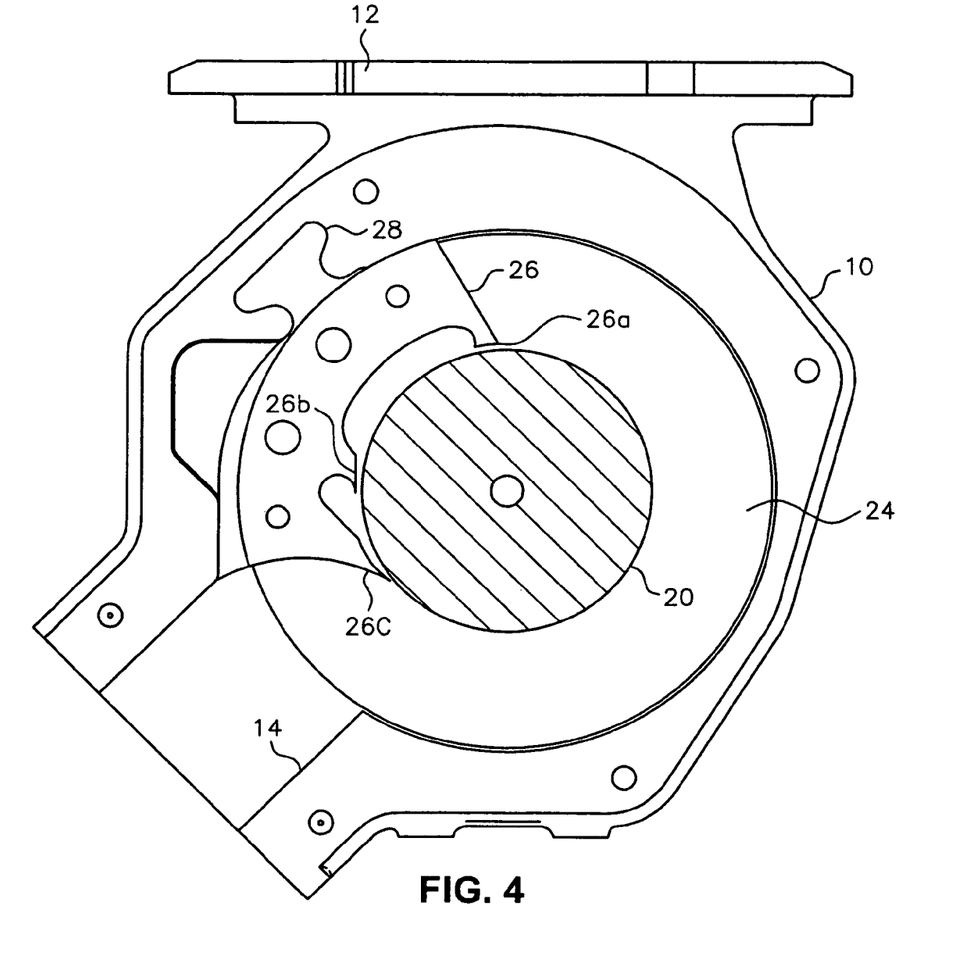
FIG. 4 is a side view showing the relationship of the drive rotor hub and the materials scraper illustrated in FIG. 1.

Referring to FIGS. 1, 2, and 4, a bulk materials pump feeder, constructed in accordance with the present invention, preferably includes a materials scraper 26 that is mounted in a recess 28 in inner wall 16 of housing 10 downstream from outlet 14 and upstream from inlet 12. Materials scraper 26 extends into drive rotor 18 in the space between the interior faces of drive disks 24 almost touching hub 20.

Certain materials that are transferred through the bulk materials pump feeder will cling, under certain conditions, to drive rotor 18. Such clinging material may not be discharged through outlet 14. Materials scraper 26 scrapes clinging material from drive rotor 18 and, generally, this material falls back and is discharged successfully through outlet 14.

Materials scraper 26 has two surfaces 30 (only one is illustrated in FIG. 1) that face the circumferential edges of drive disks 24. The distance between surfaces 30 of materials scraper 26 and the circumferential edges of drive disks 24 increases in the direction of rotation of drive rotor 18 from the distance between inner wall 16 of housing 10 and the circumferential edges of drive disks 24 at outlet 14 of housing 10 to the distance between inner wall 16 of housing 10 and the circumferential edges of drive disks 24 at inlet 12 of housing 10. In particular, surfaces 30 of materials scraper 26 are continuations, in effect, of inner wall 16 of housing 10, so that material that is not discharged at outlet 14 that tends to wedge between materials scraper 26 and the circumferential edges of drive disks 24 moves in the direction of rotation of drive rotor 18 to a larger spacing between drive disks 24 and materials scraper 26 and either falls back and is discharged through outlet 14 or falls into material that is introduced at inlet 12. The increasing space between surfaces 30 of materials scraper 26 and the circumferential edges of drive disks 24, from OUTLET 14 to Inlet 12, is illustrated in FIG. 3.

Materials scraper 26 that is illustrated in FIGS. 1 and 4 has a plurality of scraping tips 26a, 26b, and 26c that scrape material that is not discharged at outlet 14. As illustrated in FIG. 4, the spacing between materials scraper 26 and hub 20, specifically the spacing between scraping tips 26a, 26b, and 26c and hub 20, increases in the direction of rotation of drive rotor 18 from outlet 14 to inlet 12 to reduce, or even eliminate, the tendency of material to wedge between materials scraper 26 and hub 20. Scraping tips 26a, 26b, and 26c can be points on a spiral or simply points that are spaced from hub 20 the desired distances.

Figure 5:
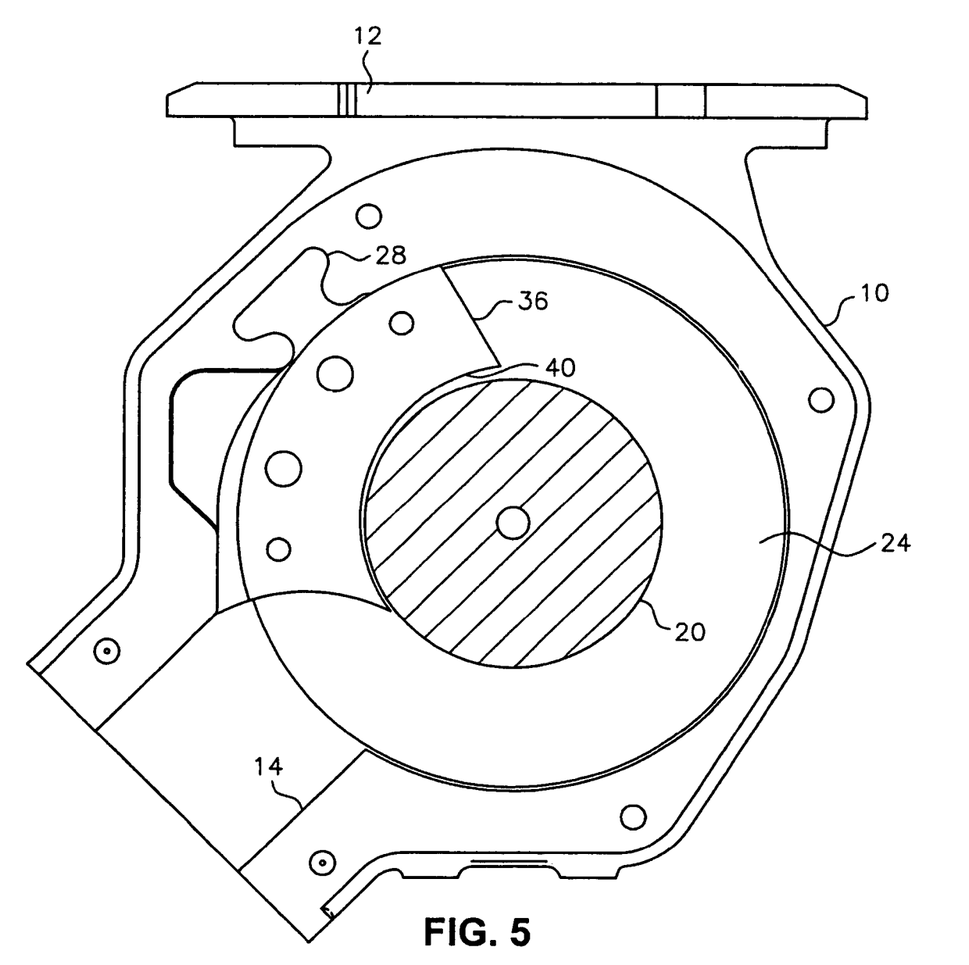
FIG. 5 is a side view showing the relationship of the drive rotor hub illustrated in FIG. 1 and a second materials scraper.

A second form of materials scraper 36 is illustrated in FIG. 5. Materials scraper 36 of FIG. 5 has a continuous scraping surface 40, rather than a plurality of scraping tips 26a, 26b, and 26c as in materials scraper 26 shown in FIG. 4. The spacing between scraping surface 40 of materials scraper 36 and hub 20 increases in the direction of rotation of drive rotor 18 from outlet 14 to inlet 12 to reduce, or even eliminate, the tendency of material to wedge between materials scraper 36 and hub 20. Scraping surface 40 of materials scraper 36 can be spiral shaped.

In the first embodiment of the present invention described above, the distance between the circumferential edges of drive disks 24 and inner wall 16 of housing 10 increases from Inlet 12 of housing 10 to OUTLET 14 of housing 10 in the direction of rotation of drive rotor 18. The material being transferred through the bulk materials pump feeder does not wedge because of the increasing space between the circumferential edges of drive disks 24 and inner wall 16 of housing 10. Two other embodiments of the present invention also reduce the possibility of material jamming drive disks 24 when the bulk materials pump feeder is in operation.

Figure 6:
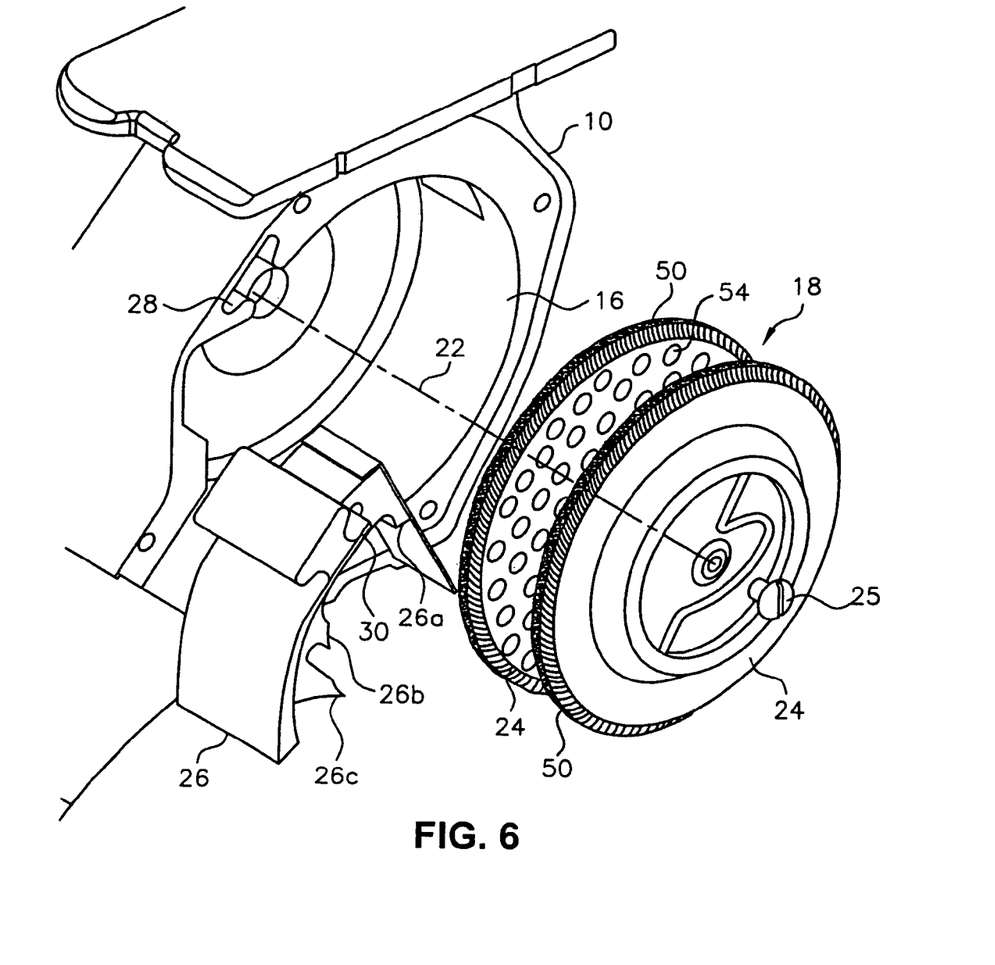
FIG. 6 is an exploded, perspective view of a bulk materials pump feeder constructed in accordance with a second embodiment of the present invention.
Figure 7:
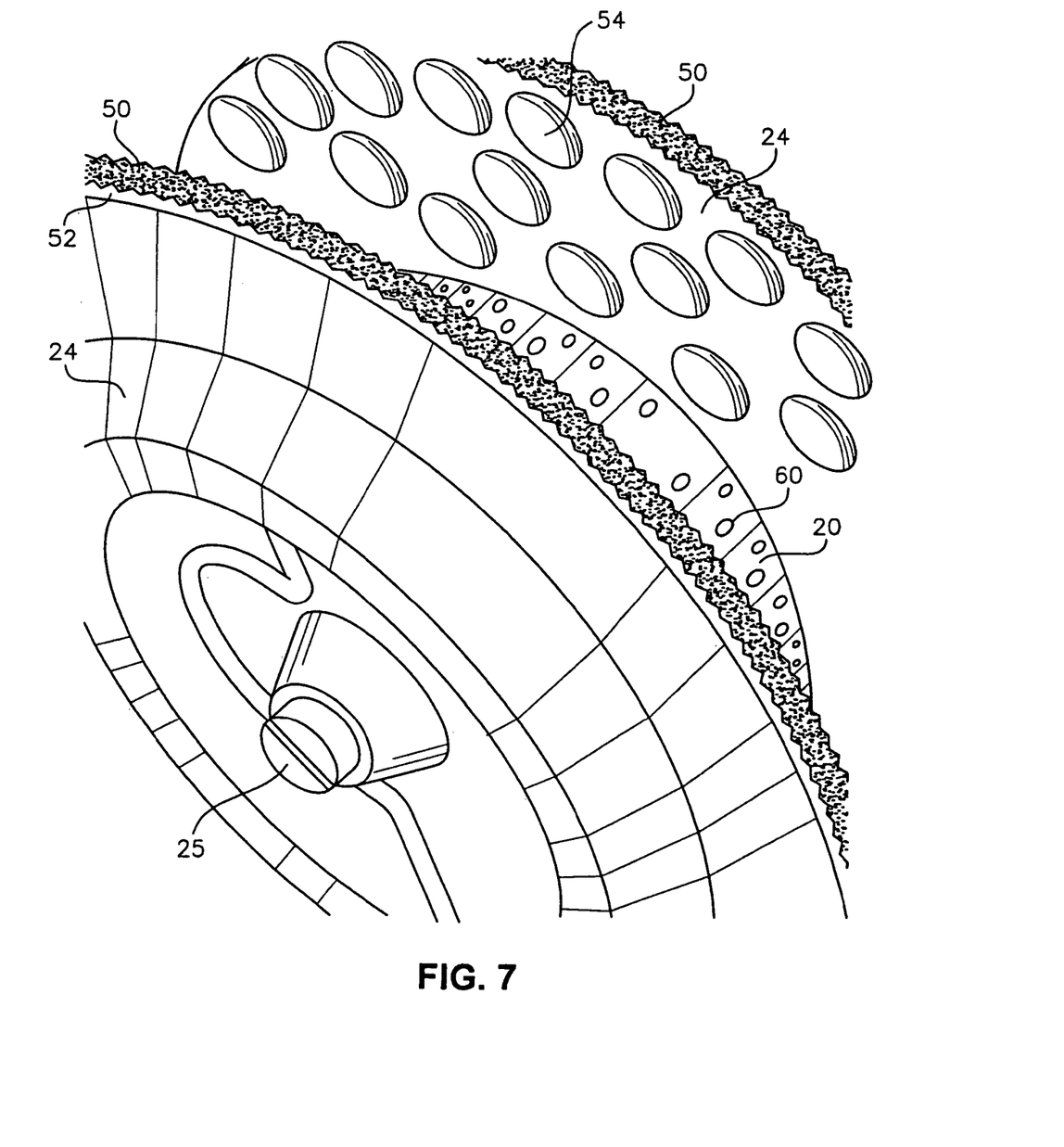
FIG. 7 is an exploded, perspective view of the drive disks of the bulk materials pump feeder shown in FIG. 6.

B. SECOND EMBODIMENT in the second embodiment of the present invention, as illustrated in FIGS. 6 and 7, a low-friction brush seal 50 is disposed on the periphery of drive disks 24. Brush seal 50 may be made of a number of different materials including, for example, pipe cleaner and rope. Brush seal 50 also may be constructed by combining a base made of metal, such as carbon steel, stainless steel, or aluminum, with a non-metallic brush made of a natural or synthetic fiber.

It is not necessary that brush seal 50 form a perfect seal between the periphery of drive disks 24 and inner wall 16 of housing 10. Although a small amount of contact occurs between brush seal 50 and inner wall 16 of housing 10, brush seal 50 induces little or no friction between drive disks 24 and inner wall 16 of housing 10 as drive disks 24 rotate. A low-friction seal is important to avoid an extra load on the drive motor. Moreover, the addition of brush seal 50 does not introduce tolerance issues into the design of the bulk materials pump feeder.

Brush seal 50 may be attached to the periphery of drive disks 24 in a variety of ways. For example, brush seal 50 may be adhered to drive disks 24 using an adhesive such as glue. A presently preferred method for attaching brush seal 50 to drive disks 24 is to provide a groove or channel 52 in the edges of drive disks 24 that form the periphery of drive disks 24. Brush seal 50 is packed (i.e., wedged) into channel 52 in the edge of each drive disk 24. Of course, various methods may be combined to attach brush seal 50 to drive disks 24. Thus, for example, brush seal 50 may be both packed into and glued to channel 52.

Brush seal 50 prevents or at least minimizes the possibility of particles, which are sufficiently large to cause problems, from entering the region between the peripheral edges of drive disks 24 and housing 10. Particles that are sufficiently small to pass through brush seal 50 are unlikely to cause problems. Brush seal 50 achieves its function well for both pellet and powder materials. A specific benefit achieved by brush seal 50 for applications involving powder materials is that the material does not build up or grind between the peripheral edges of drive disks 24 and inner wall 16 of housing 10.

Brush seal 50 prevents or at least minimizes the possibility of particles wedging between the peripheral edges of drive disks 24 and inner-wall 16 of housing 10. Brush seal 50 also prevents or at least minimizes the possibility of particles passing through the gap formed between drive disks 24 and inner wall 16 of housing 10. Thus, brush seal 50 helps to retain particles in the materials transfer duct defined by inner wall 16 of housing 10, the inside surfaces of drive disks 24, and hub 20, preventing the particles from causing problems by interfering with components of the bulk materials pump feeder outside the materials transfer duct. Such retention also achieves the advantage of a cleaner bulk materials pump feeder, minimizing the need to clean and promoting the aesthetic appeal of the bulk materials pump feeder.

As mentioned above, drive disks 24 can be formed with radially extending discontinuities on the interior faces as described and illustrated in U.S. Pat. No. 5,355,993 to facilitate transfer of material from inlet 12 to outlet 14 of housing 10. As illustrated in FIGS. 6 and 7, the interior faces of drive disks 24 can have other features that give such faces texture. Dimples 54 are shown in FIGS. 6 and 7.

Textural features such as dimples 54 increase the friction between drive disks 24 and the material being handled by the bulk materials pump feeder. Such friction facilitates movement of the material through the materials transfer duct. Because optimal performance of the materials transfer duct depends upon a consistent, linear relationship between the material feed rate and the speed of the bulk materials pump feeder, slippage must be avoided. Some friction between drive disks 24 and the material being handled by the bulk materials pump feeder avoids slippage and helps to assure a linear speed of materials delivery.

As would be understood by a person of ordinary skill in the art, the two embodiments of the present invention described above may be independently incorporated in the bulk materials pump feeder according to the present invention. Alternatively, the two embodiments can be combined into a single bulk materials pump feeder. At least for certain applications, such combination may be expected to achieve a synergistic effect.

C. THIRD EMBODIMENT

Figure 8:
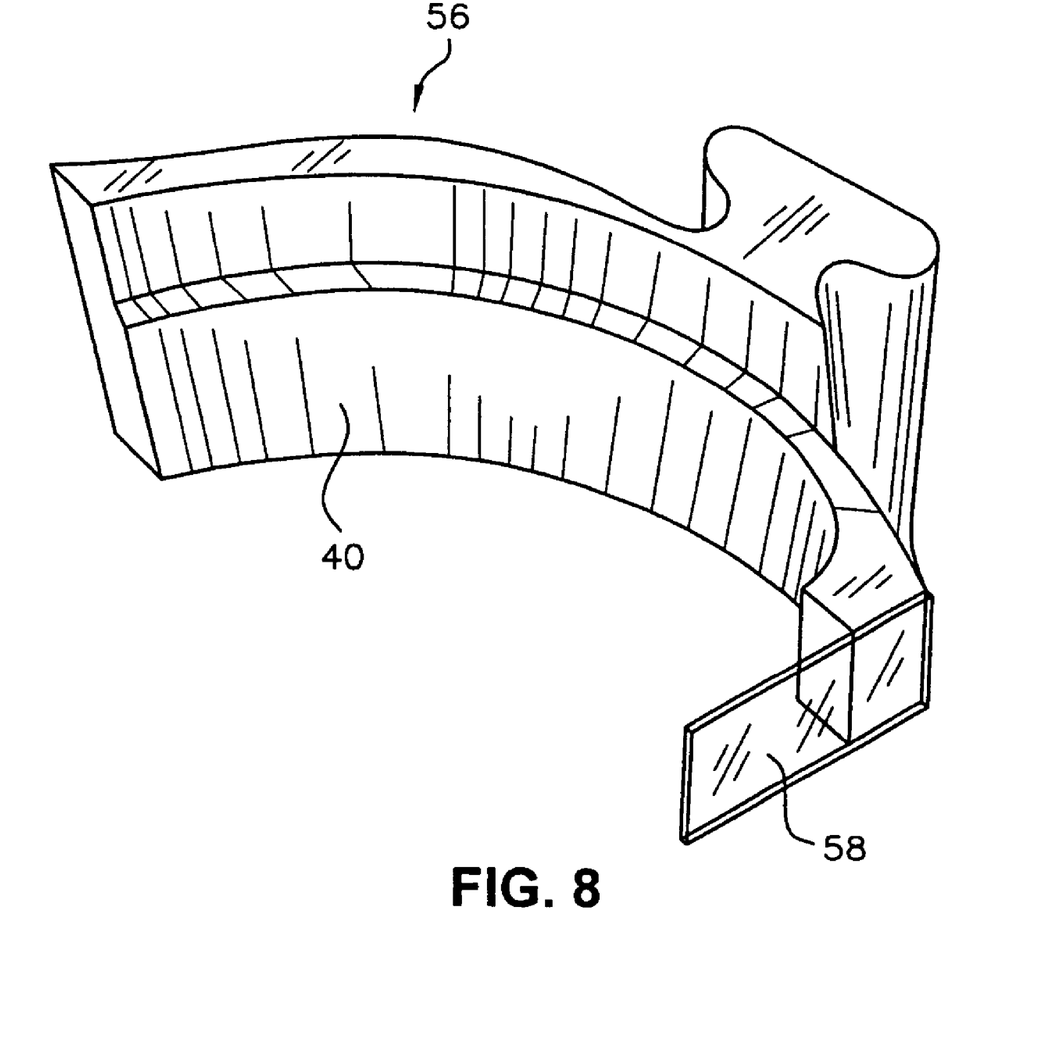
FIG. 8 is a perspective view of a third materials scraper of the bulk materials pump feeder constructed in accordance with a third embodiment of the present invention.
Figure 9:
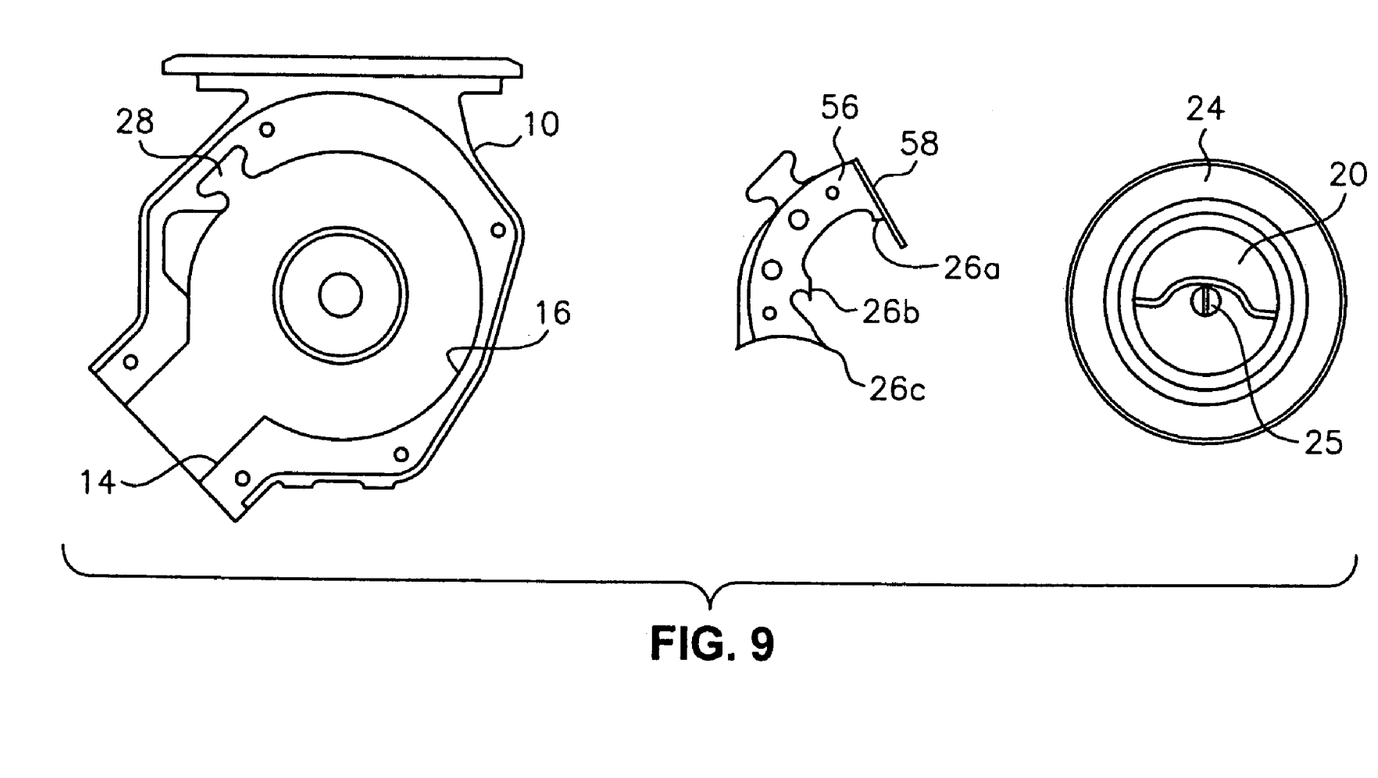
FIG. 9 is an exploded, perspective view of a bulk materials pump feeder constructed in accordance with the third embodiment of the present invention.

In the third embodiment of the present invention, as illustrated in FIGS. 8 and 9, a third form of materials scraper 56 is provided. As illustrated in FIG. 8, materials scraper 56 may have a continuous scraping surface 40 like materials scraper 36 of FIG. 5. Alternatively, as illustrated in FIG. 9, materials scraper 56 may have a plurality of scraping tips 26a, 26b, and 26c as does materials scraper 26 shown in FIG. 4.

The function of materials scraper 56 is to scrape the materials handled by the bulk materials pump feeder from drive disks 24 and hub 20 as the materials exit the bulk materials pump feeder. For many materials, such scraping is unnecessary. Materials scraper 56 is especially adapted for those applications which require no or only a minimal amount of scraping. Specifically, relative to materials scraper 26 of FIG. 4 and materials scraper 36 of FIG. 5, a majority of the structure forming materials scraper 56 has been eliminated (shown best in FIG. 8). In addition, materials scraper 56 has been provided with a flexible tip 58. Flexible tip 58 may be made of any suitable material; an elastomer or a clear plastic are acceptable. Preferably, flexible tip 58 is conductive so that electrostatic charge is dissipated. Electrostatic charge can build up or be derived from the passage of charged particles through a medium or conduit composed of essentially non-conductive materials.

Flexible tip 58 allows material to enter the bulk materials pump feeder through inlet 12 in its normal fashion, but prevents the material from flowing backward to the discharge point proximate outlet 14. Were flexible tip 58 omitted entirely from materials scraper 56, material could leak backward through the bulk materials pump feeder. In addition, when the bulk materials pump feeder is operating to feed material, some material tends to be carried by drive disks 24 and hub 20 past the discharge point—mainly due to the static charge of the material. The material clinging to the drive disks 24 and hub 20 tends to become caught or wedged between drive disks 24 and the materials scraper, jamming the bulk materials pump feeder. Flexible tip 58 solves this problem: materials that travel around past the discharge point either are deflected by flexible tip 58 and enter outlet 14 or pass by flexible tip 58 and reenter the materials stream directed toward the discharge. Materials scraper 56 having flexible tip 58 also prevents materials from jamming between the sides of drive disks 24 and the materials scraper.

Materials scraper 56 provides yet another advantage. Discussed above are the benefits provided by texturing the interior faces of drive disks 24 with such features as dimples 54 shown in FIGS. 6 and 7. It would be similarly advantageous to give hub 20 texture 60, shown in FIG. 7, in addition to texturing the interior faces of drive disks 24. Texture 60 on hub 20 has a drawback, however, because most materials tend to wedge between the textured areas (e.g., dimples) of hub 20 and materials scraper 26, 36. Thus, for most materials handled by the bulk materials pump feeder, it is not possible to texture hub 20 and the benefits of such texturing are lost.

Because materials scraper 56 having flexible tip 58 minimizes the tendency of materials to wedge between texture 60 of hub 20 and materials scraper 56, however, incorporation of materials scraper 56 into the bulk materials pump feeder permits hub 20 to have texture 60. Thus, the advantages of texturing hub 20 are achieved.

As would be understood by a person of ordinary skill in the art, the three embodiments of the present invention described above may be independently incorporated in the bulk materials pump feeder according to the present invention. Alternatively, any two or even all three of the embodiments can be combined into a single bulk materials pump feeder. At least for certain applications, such combination may be expected to achieve a synergistic effect.

Although illustrated and described above with reference to certain specific embodiments, the present invention nevertheless is not intended to be limited to the details shown. Rather, various modifications may be made in the details within the scope and range of equivalents of the claims and without departing from the spirit of the invention.

What is claimed is:

1. A bulk materials pump feeder comprising:
    a housing having:
        (a) an inlet,
        (b) an outlet, and
        (c) an inner wall extending from the inlet to the outlet;
    a drive rotor having:
        (a) a hub rotatable about a rotation axis, and
        (b) a plurality of drive disks having a periphery and extending away front the hub toward the inner wall of the housing;
        (c) low-friction seals disposed on the periphery of the drive disks; and
    a materials scraper:
        (a) mounted in the housing,
        (b) extending into the drive rotor between the drive disks, and
        (c) having a flexible tip configured to prevent material handled by the bulk materials pump feeder from either flowing backward to a discharge point proximate the outlet of the housing or jamming between the drive disks and the materials scraper;
    the inner wall of the housing, the drive disks, and the hub defining a materials transfer duct through which material is transferred from the inlet of the housing to the outlet of the housing.

2. The bulk materials pump feeder according to claim 1 wherein the housing further has a recess in the inner wall downstream from the outlet of the housing and upstream from the inlet of the housing relative to the direction of rotation of the drive rotor and the materials scraper is mounted in the recess.

3. The bulk materials pump feeder according to claim 1 wherein the materials scraper also has a plurality of scraping tips.

4. The bulk materials pump feeder according to claim 1 wherein the materials scraper has a continuous scraping surface.

5. The bulk materials pump feeder according to claim 1 wherein the distance between the periphery of said drive disks and said inner wall of said housing continuously increases from said inlet of said housing to said outlet of said housing in the direction of rotation of said drive rotor, thereby providing a continuously increasing space between the periphery of said drive discs and said inner wall of said housing.

6. The bulk materials pump feeder according to claim 1 wherein the inner wall is spiral shaped.

7. The bulk materials pump feeder according to claim 6 wherein the spiral shape is different by the equation R=theta*a.

8. The bulk materials pump feeder according to claim 1 wherein the materials scraper further comprises at least three scraping tips with a distance between scraping tips that increases in the direction of rotation of the drive rotor.

9. The bulk materials pump feeder according to claim 1 wherein, the materials scraper further comprises a continuous scraper proximate the hub and a distance between the scraping surface and the huh that increases in the direction of rotation of the drive rotor.

10. The bulk materials pump feeder according to claim 1 wherein the flexible tip is configured to dissipate electrostatic charge.

11. The bulk materials pump feeder according to claim 1 wherein the drive rotor hub is textured.

12. The bulk material pump feeder according to claim 1 wherein a small amount of contact occurs between the seals and the inner wall.

13. The bulk material pump feeder according to claim 1 wherein the low-friction seals comprise brush seals.

14. The bulk material pump feeder according to claim 1 wherein the low-friction seals have a radial extent proximate the inner wall of the housing.

15. The bulk material pump feeder according to claim 1 wherein the low-friction seals are configured to minimize the entry of material into an area between the periphery of the drive disks and the inner wall of the housing.

* * * * *